(12) United States Patent
Gill et al.

(10) Patent No.: US 7,434,299 B1
(45) Date of Patent: Oct. 14, 2008

(54) METHODS FOR THE PRECISE LOCATING AND FORMING OF ARRAYS OF CURVED FEATURES INTO A WORKPIECE

(75) Inventors: David Dennis Gill, Albuquerque, NM (US); Gordon A. Keeler, Albuquerque, NM (US); Darwin K. Serkland, Albuquerque, NM (US); Sayan D. Mukherjee, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/946,077

(22) Filed: Nov. 28, 2007

(51) Int. Cl.
*B23B 27/00* (2006.01)
*B23C 9/00* (2006.01)

(52) U.S. Cl. ............... 29/27 C; 29/26 A; 409/131; 409/165

(58) Field of Classification Search .......... 29/27 C, 29/28, 50, 26 A, 560; 409/132, 131, 235, 409/165, 80, 84, 201, 202; 408/234, 143, 408/124, 97; 82/149, 122; 451/5, 8, 11, 451/41, 42, 44, 255, 265
See application file for complete search history.

(56) References Cited

U.S. PATENT DOCUMENTS

| | | | |
|---|---|---|---|
| 5,456,864 A | 10/1995 | Wickes et al. | |
| 5,678,967 A | 10/1997 | Savoie | |
| 5,711,647 A | 1/1998 | Slocum | |
| 5,919,013 A | 7/1999 | Savoie | |
| 6,036,873 A | 3/2000 | Richards | |
| 6,402,996 B1 | 6/2002 | Border et al. | |
| 6,597,510 B2 | 7/2003 | Bunkenburg et al. | |
| 7,308,745 B2 * | 12/2007 | Diehl et al. | 29/50 |
| 7,322,082 B2 * | 1/2008 | Natsume et al. | 29/560 |
| 7,373,706 B2 * | 5/2008 | Savoie | 29/27 C |

OTHER PUBLICATIONS

Gill et al., "A Novel Method for the On-Center Turning of Tightly Toleranced Micro Arrays", presented at the American Society for Precision Engineers Annual Meeting, Oct. 2007, Dallas, TX, USA.

* cited by examiner

*Primary Examiner*—Dana Ross
(74) *Attorney, Agent, or Firm*—William R. Conley

(57) ABSTRACT

Methods for manufacturing high precision arrays of curved features (e.g. lenses) in the surface of a workpiece are described utilizing orthogonal sets of inter-fitting locating grooves to mate a workpiece to a workpiece holder mounted to the spindle face of a rotating machine tool. The matching inter-fitting groove sets in the workpiece and the chuck allow precisely and non-kinematically indexing the workpiece to locations defined in two orthogonal directions perpendicular to the turning axis of the machine tool. At each location on the workpiece a curved feature can then be on-center machined to create arrays of curved features on the workpiece. The averaging effect of the corresponding sets of inter-fitting grooves provide for precise repeatability in determining, the relative locations of the centers of each of the curved features in an array of curved features.

12 Claims, 6 Drawing Sheets

METHODS FOR THE PRECISE LOCATING AND FORMING OF ARRAYS OF CURVED FEATURES INTO A WORKPIECE

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to methods for precisely locating and forming one and two-dimensional arrays of curved features into a surface of a workpiece. The invention further relates to methods for maintaining precise center to center lens spacings in machining arrays of miniature optical lenses (and/or their mold counterparts) into a workpiece. The invention further relates to precisely locating the relative centers of the individual lenses within an array of lenses machined into the surface of a rotating workpiece, wherein the center to center spacing of the lenses is non-kinematically and precisely determined by indexably positioning the workpiece with respect to a workpiece holder, comprising the utilization of a plurality of inter-fitting locating grooves.

BACKGROUND OF THE INVENTION

The need for methods to produce high-precision arrays of miniature and micro lenses has been driven in part by the development of high speed optical switches and optical couplers commonly used in telecommunications equipment, as well as the development of advanced high speed optoelectronics and instrumentation. In one non-limiting exemplary application, it is desired to maintain a center to center spacing of 250 μm within a positioning error of 2 μm, in a four by four array of sixteen micro lenslets comprising hyperbolic aspheres having apertures of 220 μm.

The present methods were developed to exceed these specifications through a unique positioning and indexing approach that allows a workpiece to be indexably positioned and re-positioned in two (e.g. orthogonal) directions parallel to the rotating spindle face of a machine tool. The methods utilize matching sets of inter-fitting locating grooves that can be cut or scribed into a workpiece, and a workpiece holder affixed to the spindle face of a machine tool. The workpiece can then be positioned and re-positioned by distances equal to an integral number of groove spacings in one or more directions parallel to the surface of the workpiece, to precisely and non-kinematically determined locations. At each location a curved feature (e.g. lens shape, lens mold shape, cylinder, cone etc.) can then be on-center machined into the surface of the workpiece. The use of a plurality of inter-fitting locating grooves provides an averaging effect to minimize any positional errors that may occur, thereby affording a high level of repeatability and precision in locating the relative centers of the curved features in an array thus produced.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

While the following non-limiting examples describe the invention in terms of orthogonal sets of inter-fitting locating grooves cut into a workpiece that mate to corresponding sets of locating grooves cut into a workpiece holder, it is to be appreciated that the inter-fitting locating grooves need not necessarily be oriented on orthogonal axes, but could as well be oriented on any two axes oriented at any angle of convenience. In addition to the grooves not needing to be perpendicular, there is no requirement that the grooves have equal pitch spacings along the given axes, for example, a set of "x-axis" locating grooves could have a pitch that is different than a set of "y-axis" locating grooves. The following examples additionally describe forming curved features into a workpiece by means of a single point diamond turning (SPDT) tool, but other forming and turning tools could be utilized as well (e.g. diamond milling, steel tools etc.).

The following non-limiting examples are directed to the formation of a four by four array of sixteen micro lenslets in the surface of a workpiece comprising a 1 mm thick disc of an optical polymer, for example, Zeonex® E48R optical polymer, commercially available from Zeon Chemicals L.P., Louisville, Ky., USA. Within the array, it is desired to maintain a center to center spacing of 250 μm within a positioning error of 2 μm, an axial (i.e. through the thickness of the workpiece) positional tolerance of +/−1 μm, and a form tolerance of λ/10 (e.g. where λ=1550 nm). Each micro lenslet in this example, comprises a hyperbolic asphere having an aperture of 220 μm.

Figure 1:
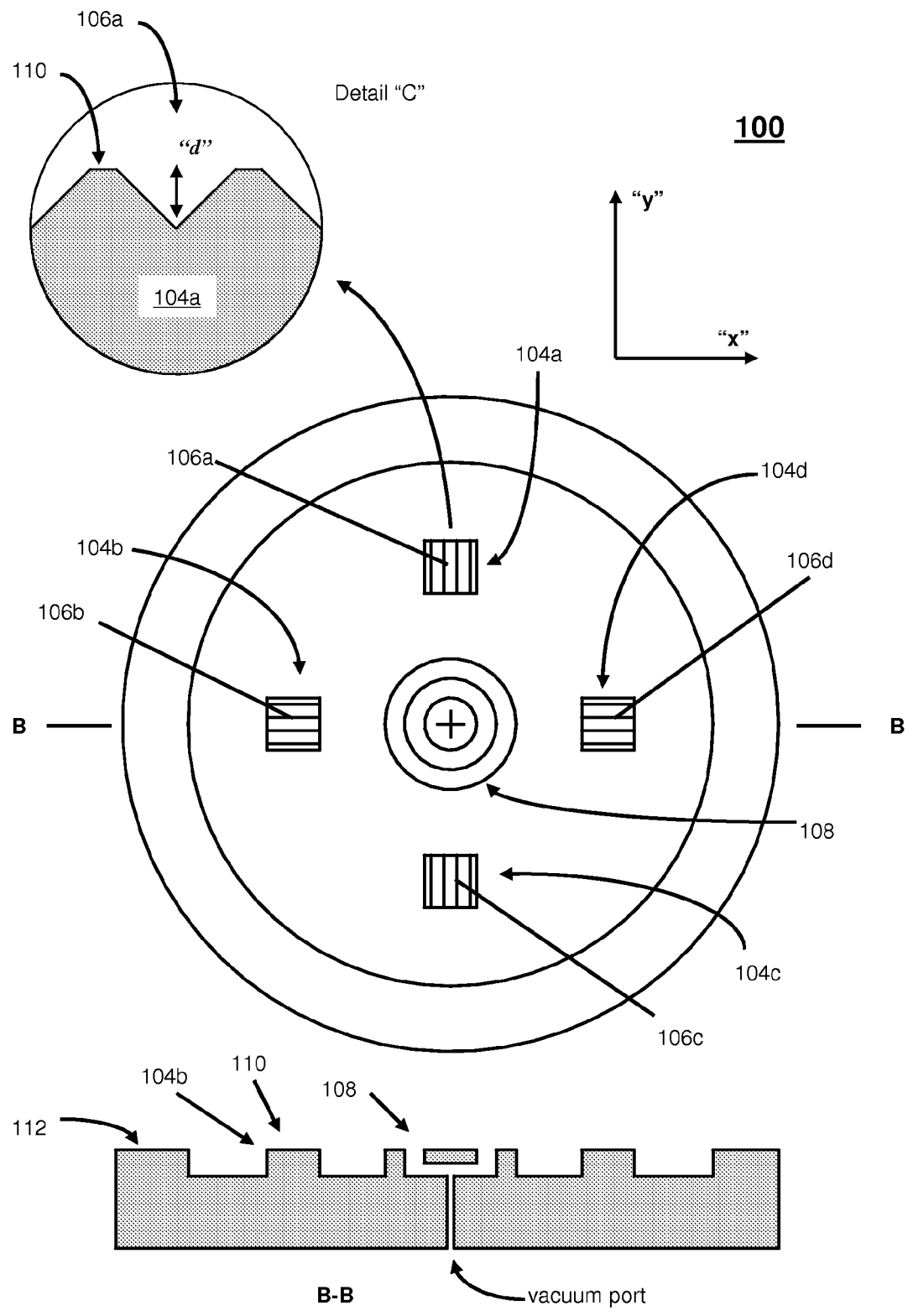
FIG. 1 is a schematic diagram of an embodiment of a workpiece holder according to the methods of the present invention.

FIG. 1 is a schematic diagram of a workpiece holder according to embodiments of the present invention. The workpiece holder 100 is shown in plan view, cross sectional view "B-B", and detail cross sectional view "C". In this example, the workpiece holder 100 is illustrated as circular for convenience in attachment to the rotating spindle face of a machine tool (not shown). Other shapes for the workpiece holder 100 are anticipated as well by the present methods. Workpiece holder 100 comprises a vacuum chuck feature 108 for securing a workpiece to the holder. Other chucking/securing features could be used as well, for example clamps or threaded fasteners as appropriate for a given application. In this embodiment, four raised pillars 104 a-d are located external of the vacuum chucking feature 108, with the upper surface of each raised pillar 104 a-d being provided with a set of "Vee" grooves 106 a-d. Two of the sets of Vee grooves (e.g.

106 *a* and *c*) are parallel to the "y" direction with the other two sets of Vee grooves (e.g. 106 *b* and *d*) parallel to the "x" direction.

In the exemplary embodiment, each of the four square pillars surrounding the vacuum chuck each have nine parallel grooves cut into the top surface of the pillar. These grooves can be cut with an approximately 90 degree diamond point tool on a 250 μm pitch, to match the desired pitch spacing of the lenslet array. These grooves help to ensure that the workpiece (e.g. a disc of optical material) can be indexably positioned between desired locations in 250 μm increments. While the positioning of workpiece and therefore the array of lenslets is not kinematically determinant, the present methods rely on the principle of averaging to achieve highly repeatable and precise positioning of the workpiece, and therefore of each lens formed in the surface of the workpiece. In embodiments of the invention, the grooves were scribed into the towers using a diamond tip tool, followed by facing the top surface of the workpiece holder to truncate the peaks 110 of the grooves as illustrated in detail "C". After the facing operation, the grooves had a depth "d" of approximately 0.095 mm. As described below, truncating the peaks of the grooves causes contact between inter-fitting grooves in mating a workpiece to the workpiece holder, to occur on the angled sidewalls of the grooves, and not at the root of a groove or tip of a matching peak.

The Vee grooves on the towers and the matching Vee grooves on the workpiece are cut so that they will inter-fit and contact, approximately 1 μm prior to the workpiece contacting the top surface of the vacuum chuck. This can be done to ensure that the workpiece is well positioned before it is pulled into contact with the vacuum chuck, which in the present example, has been found to deflect the workpiece on the order of 1 μm. The lands of the vacuum chuck 108, the lands on the Vee grooves 110, and the outer diamond turned surface 112, of the workpiece holder can all be cut (e.g. faced) to the same height. This allows the same workpiece holder to be used when machining workpieces that may or may not have a matching set of inter-fitting grooves.

Figure 2:
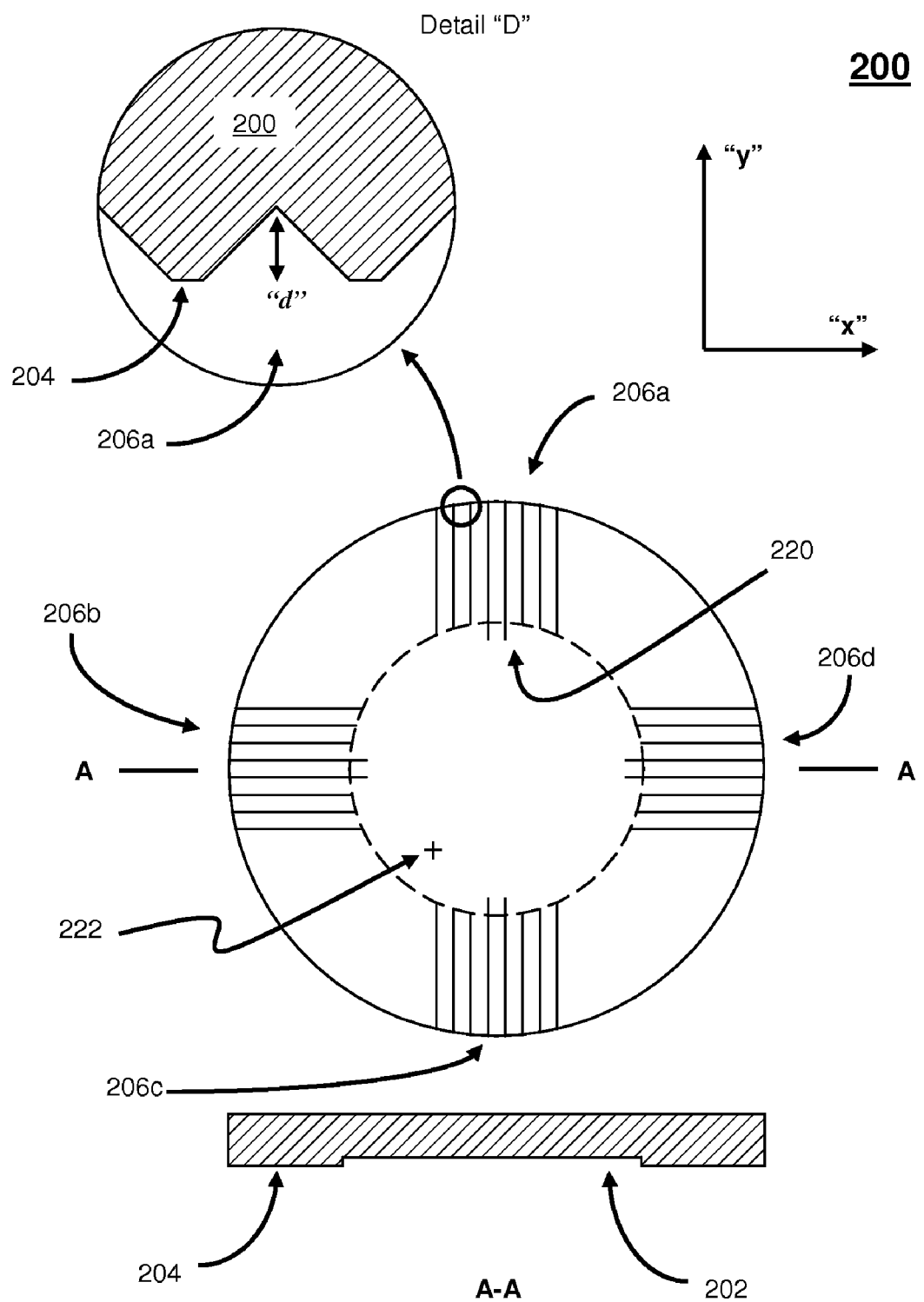
FIG. 2 is a schematic diagram of an embodiment of a workpiece according to the methods of the present invention.

FIG. 2 is a schematic diagram of an embodiment of a workpiece according to the methods of the present invention. FIG. 2 illustrates the workpiece 200 in plan view, cross-sectional view "A-A" and detail cross-sectional view "D". The workpiece 200 can comprise a 1 mm thick disc of an optical polymer, for example when it is desired to cut lenslets directly into an optical substrate, or the workpiece could as well comprise a mold blank (e.g. metal or polymer blank) into which the negative image of a desired lenslet array can be cut to allow for replication of lenslet arrays by molding. The workpiece 200 is prepared by facing the backside of the workpiece and cutting a circular recess 202 into the disc. In keeping with the present example, this recess can be cut to a depth of approximately 55 μm. The recessed surface 202 is the surface of the workpiece that will contact the vacuum chuck 108 of the workpiece holder 100. The recess 202 is cut of a sufficiently larger diameter than the vacuum chuck 108, to allow the part to be indexed and repositioned over a desired working area. In the present example, the workpiece can be moved +/−1.5 mm in the "x" and "y" directions.

The raised annular area 204 of the workpiece 200 is further prepared by cutting as described above, four sets of Vee grooves 206 *a-d*. Two of the sets of Vee grooves (e.g. 206 *a* and *c*) are parallel to the "y" direction with the other two sets of Vee grooves (e.g. 206 *b* and *d*) parallel to the "x" direction. Detail "D" illustrates a cross section of the Vee grooves that are cut to inter-fit and mate with the Vee grooves 104 *a-d* of the workpiece holder 100. In the present example the annular surface 204 is faced after cutting twenty four parallel Vee grooves at each location 206 *a-d*, to produce the truncated peaks as shown in detail "D". Additional alignment features for example as shown at 220 and 222 can be provided on the workpiece to aid in subsequent operations, for example in joining the lenslet array to an eventual optical system.

Figure 3:
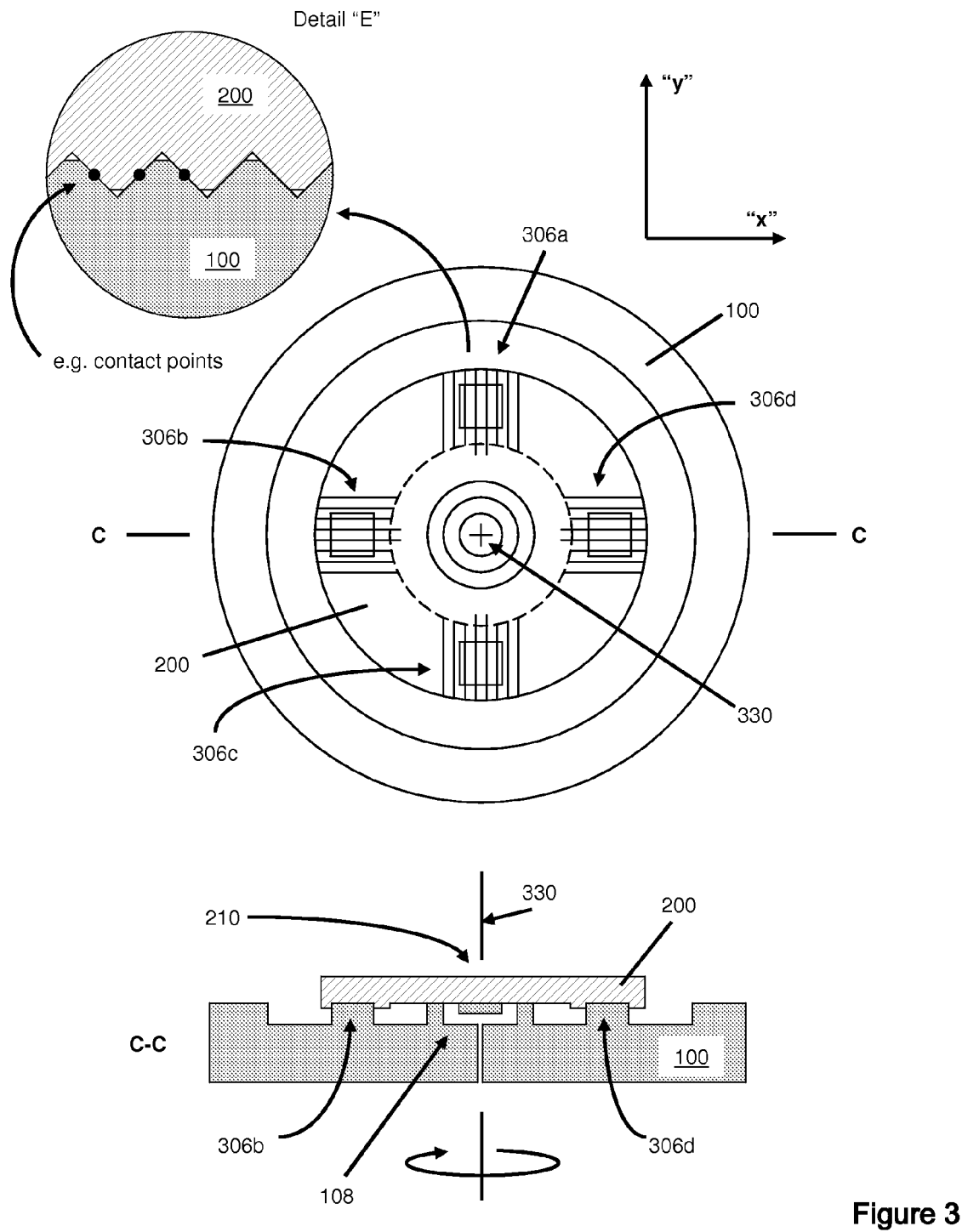
FIG. 3 is a schematic diagram of the workpiece of FIG. 2, centered on the workpiece holder of FIG. 1.

FIG. 3 is a schematic diagram of the workpiece 200, centered on the workpiece holder 100. FIG. 3 illustrates the workpiece and workpiece holder in plan view, cross-sectional view "C-C" and detail cross-sectional view "E". As shown in detail "E" by truncating the peaks of the inter-fitting locating grooves causes contact between the workpiece 200 and the workpiece holder 100 to occur on the angled sidewalls of the grooves for example, at the points indicated, and not for example, at the root of a groove, or at a tip of a peak. The truncated peaks, when fitted into a groove may remove machining or other debris from the surfaces of the peaks and grooves and push this debris into the vacated region, whereby the debris will not affect the positional accuracy. The mating of the inter-fitting locating grooves at 306 *a-d* allows for precise positioning and re-positioning of the workpiece 200 with respect to the workpiece holder 100 by incremental distances in the "x" and "y" directions as equal to multiples of the Vee groove spacing. In the present example the Vee groove spacing was chosen to be 250 μm, equaling the pitch of the lenslet array. In this manner, the inter-fitting locating grooves allow the workpiece 200 to be re-positioned around the workpiece holder 100 in precise 250 μm increments. For each location where the workpiece is re-positioned on the workpiece holder, a lenslet can be formed in the surface 210 of the workpiece by turning or cutting about the rotational axis 330 of a machine tool (not shown) upon which the workpiece holder can be mounted. Each lens in a lenslet array can therefore be on-center machined with respect to the rotational axis 330, at a location on the surface of the workpiece, with the workpiece then indexably re-positioned by one or more increments equal to the Vee groove spacing, where the next lenslet in the array can be machined.

Figure 4:
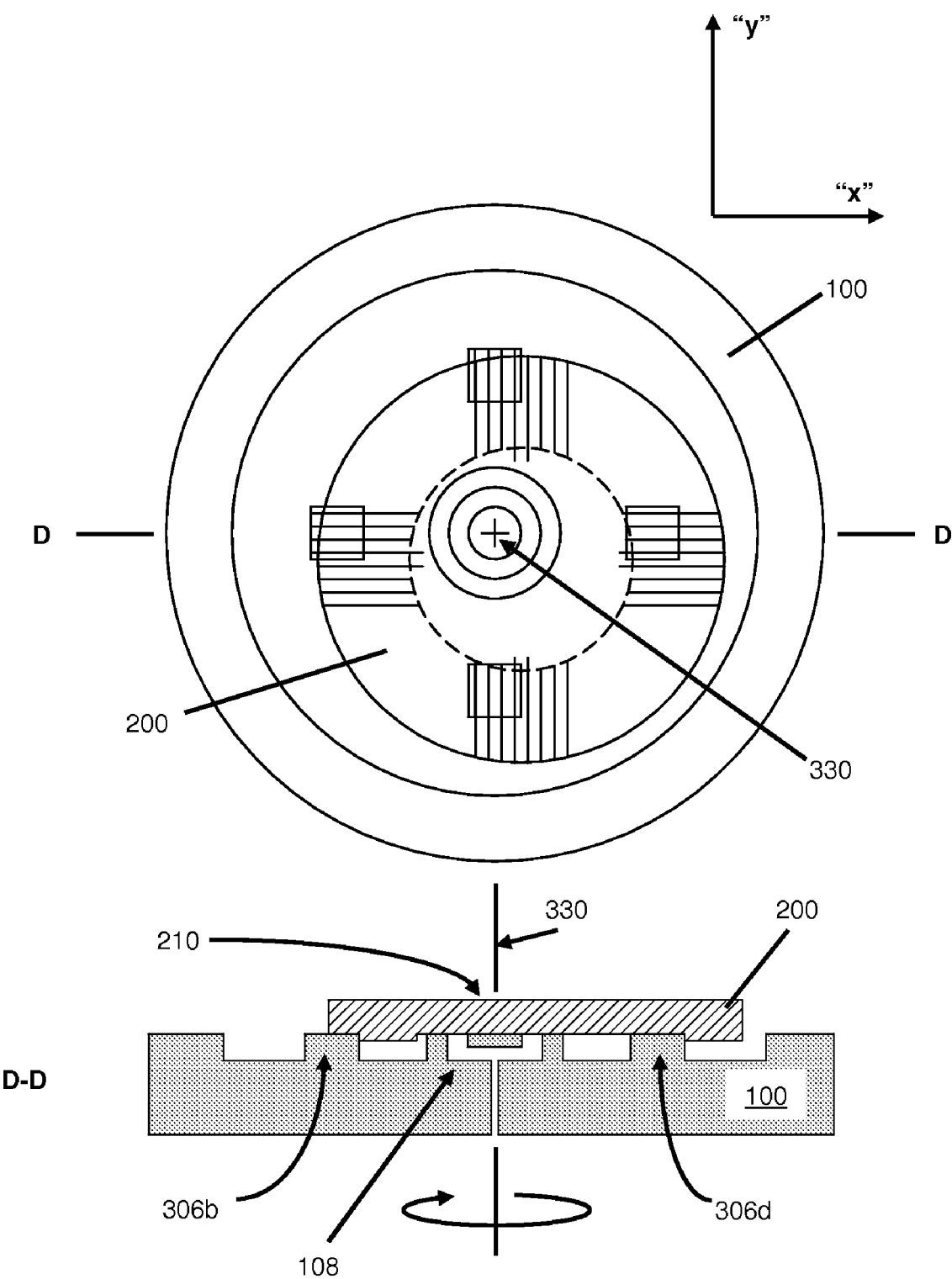
FIG. 4 is a schematic diagram of the workpiece and workpiece holder of FIG. 3 wherein the workpiece has been indexably re-positioned a number of groove spacings in the "x" and "y" directions.

FIG. 4 is a schematic diagram of the workpiece 200 and workpiece holder 100 of FIG. 3 wherein the workpiece has been indexably re-positioned a number of groove spacings in both the "x" and "y" directions (e.g. downward and towards the lower right in the figure). FIG. 4 illustrates the workpiece and workpiece holder in plan view, and cross-sectional view "D-D". In this manner, a next location on the surface of the workpiece 200 can now be centered over the rotational axis 330, whereat another lenslet in the exemplary array of lenslets can be on-center machined.

Figure 5:
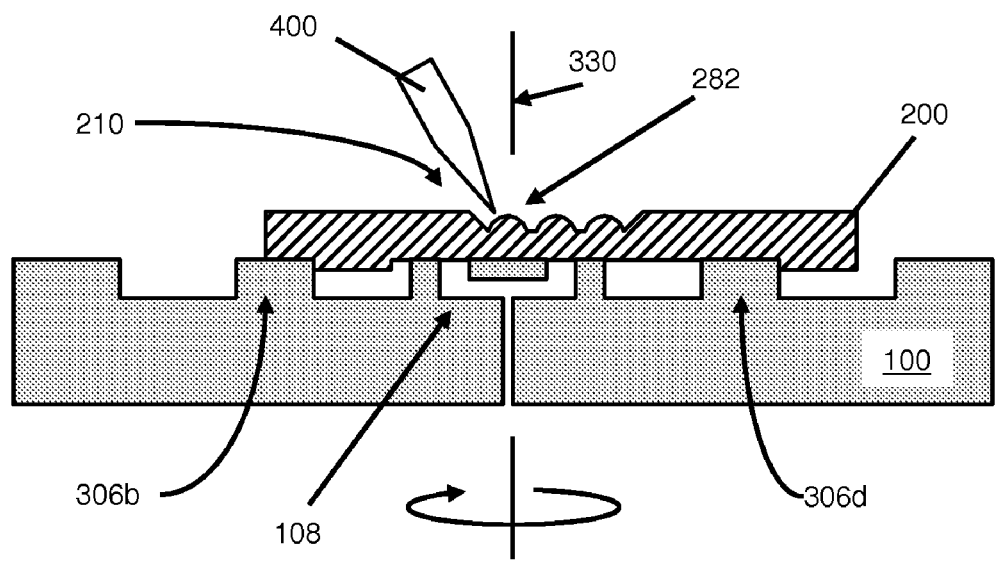
FIG. 5 is a schematic diagram of a workpiece that has been indexably re-positioned to provide for forming a two-dimensional array of nine curved features in the surface of the workpiece, according to embodiments of the present invention.
Figure 5:
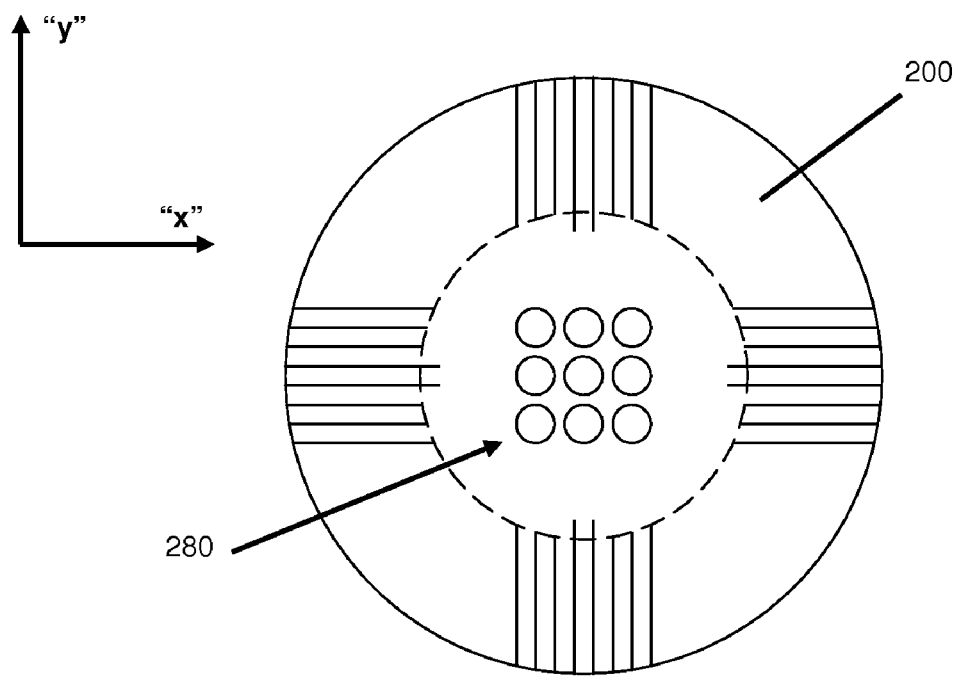

FIG. 5 is a schematic diagram of a workpiece that has been indexably re-positioned and machined to provide for forming a two-dimensional array comprising curved features (e.g. nine lenslets shown in the figure) in the surface of the workpiece according to embodiments of the present invention. FIG. 5 shows a cross-sectional view of the workpiece 200 attached to a workpiece holder 100, relative to a cutting tool 400 (e.g. a single point diamond tool) in the process of forming a curved feature 282 (e.g. lenslet) at a location centered over the rotational axis 330 of a machine tool. By indexably positioning and re-positioning the workpiece 200 on the workpiece holder 100 by means of the inter-fitting locating grooves (e.g. at 306 *b* and *d*) at each location where the workpiece is re-positioned on the workpiece holder, a lenslet can be formed in the surface 210 of the workpiece by turning or cutting about the rotational axis 330 of a machine tool. Each lens in the lenslet array 280 can therefore be on-center (e.g. with respect to the rotational axis 330) machined at a precise location on the surface of the workpiece.

In various embodiments of the invention, the workpiece holder 100 can be affixed to the rotating spindle of a machine tool by means including for example, clamps or threaded fasteners. The workpiece can be held in position on the workpiece holder by means of a vacuum chuck 108. Indexably re-positioning the workpiece on the workpiece holder can be facilitated by means of an auxiliary transfer vacuum chuck (not shown) which can be operationally configured to grasp the outer extents (e.g. away from the lenslet array) of the front surface 210 of the workpiece 200. It has been found that by mounting an auxiliary transfer vacuum chuck on a spring-loaded precision slideway, imparts some compliance in the axial direction 330 of the machine tool spindle, further facilitating the transfer process.

Initially, the workpiece can be prepared by machining the front and back surfaces to be parallel, adding the recessed portion on the back of the workpiece, and cutting the Vee grooves. In addition, alignment features can be added that are later used for dicing the workpiece into final parts, assembling the optical system, and aligning the optics. The back surface of the workpiece can for example, be machined with a large radius tool and a ninety degree included angle Vee tool. Once the back surface of the workpiece is completed, the workpiece is flipped over and mounted on the vacuum chuck 108. In this process, a set of workpiece grooves and corresponding workpiece holder grooves are located and inter-fit, so that the workpiece is correctly positioned with respect to alignment features on the workpiece, for example at an initial or reference location. This can be done using a high-magnification camera to observe the workpiece holder through the workpiece, in cases where the workpiece comprises an optical blank.

Once the workpiece is in position, the spindle can be set to free-running mode and a curved feature (e.g. lenslet) can be machined into the surface of the workpiece using a small radius diamond tool. Next, the spindle is returned to C-axis mode and positioned to 0 degrees. The machine moves the spindle so that it is in position near the auxiliary transfer vacuum chuck. The vacuum on the auxiliary chuck is turned on, the vacuum for the spindle chuck is turned off, and the spindle is moved away from the workpiece which is now positioned on the auxiliary chuck. The spindle is moved in the plane orthogonal to the spindle axis in increments of the inter-fitting locating groove spacing (250 µm in the example above) and the spindle is moved back into contact with the workpiece and the auxiliary vacuum chuck. The vacuum settings are reversed and the spindle chuck moves away with the workpiece re-positioned away from the initial location by integer multiples of the inter-fitting locating groove spacing, to a new or next location. The spindle is returned to free-running mode and a new lenslet can be machined at the new location.

In some applications of the present methods, a workpiece can be positioned off-center with respect to the workpiece holder by as much as 2.1 mm for machining lenslets at the extremes of the array. There was concern that this eccentric motion of the part would lead to excessive vibration during machining. However, the use of a low-mass workpiece, a high stiffness air-bearing spindle, and a relatively massive chuck, have prevented the workpiece's eccentric motion from inducing any substantial error in the machined lenslets.

Figure 6:
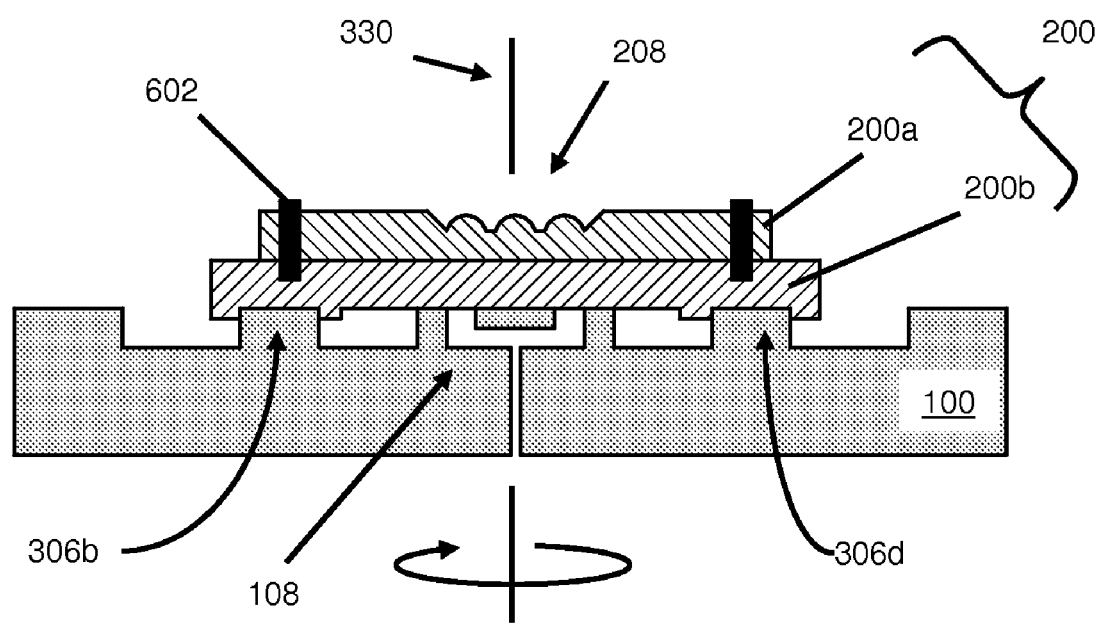
FIG. 6 is a schematic diagram of a workpiece comprising an upper part and an interposer comprising inter-fitting locating grooves for mating to a workpiece holder.

FIG. 6 is a schematic diagram of a workpiece 200 comprising an upper portion 200*a*, affixed to an interposer 200*b* comprising inter-fitting locating grooves at locations 306 *b* and d, for mating to a workpiece holder 100. In this exemplary embodiment, the upper portion 200*a* can be affixed to the interposer 200*b* by means including for example, locating pins 602, clamps, threaded fasteners and adhesives. This configuration may be appropriate for many applications wherein forming arrays of lenslets directly into the surface of an optical substrate is desired. The upper portion 200*a* and interposer 200*b* of the workpiece can be indexably re-positioned as a unit, over the workpiece holder 100 to allow for forming a lenslet array 208.

In the non-limiting examples described above, the formation of two-dimensional arrays of curved features in a workpiece illustrated the methods of the present invention. The methods are equally suited to producing one-dimensional (e.g. linear) arrays of curved features in the surface of a workpiece, where it might be desired for a given application. The above examples utilized sets of inter-fitting grooves that were located on a surface opposed to the surface being machined, and on a diameter external to the area being machined. It is to be noted however that the placement of the sets of inter-fitting grooves to specific areas of the workpiece and the workpiece holder is not a requirement in the practice of the methods according to the present invention. The layout of a workpiece, workpiece holder and the matching sets of inter-fitting grooves is a matter of convenience for a given application, and the inter-fitting grooves could as an alternative example, be placed behind the area being machined.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. A method of forming an array of precisely and non-kinematically located curved features in a surface of a workpiece, the workpiece indexably positionable on a workpiece holder, the workpiece and the workpiece holder rotatable about an axis of rotation, the axis of rotation normal to a plane parallel to the surface of the workpiece, the method comprising:

provideing a plurality of inter-fitting locating grooves on the workpiece and the workpiece holder, the inter-fitting locating grooves operationally configured to indexably position the workpiece on the workpiece holder along at least one direction within the plane;

positioning the workpiece on the workpiece holder whereby the inter-fitting locating grooves cause the axis of rotation to pass through a reference location on the surface of the workpiece;

rotating the workpiece and the workpiece holder about the axis of rotation and machining a first curved feature into the surface of the workpiece centered at the reference location;

re-positioning the workpiece on the workpiece holder whereby the inter-fitting locating grooves cause the axis of rotation to pass through a next location on the surface of the workpiece; and, rotating the workpiece and the workpiece holder about the axis of rotation and machining an additional curved feature into the surface of the workpiece centered at the next location, whereby the next location is precisely known relative to the reference location by the action of the inter-fitting locating grooves.

2. The method of claim 1 further comprising repeating one or more times, the steps of:

re-positioning the workpiece on the workpiece holder whereby the inter-fitting locating grooves cause the axis of rotation to pass through a next location on the surface of the workpiece; and, rotating the workpiece and the workpiece holder about the axis of rotation and machining an additional curved feature into the surface of the workpiece centered at the next location, whereby the next location is precisely known relative to the reference location by the action of the inter-fitting locating grooves.

3. The method of claim 1 wherein the step of providing a plurality of inter-fitting locating grooves on the workpiece and the workpiece holder comprises providing a plurality of truncated inter-fitting grooves.

4. The method of claim 3 wherein the plurality of truncated inter-fitting grooves are center to center adjacently spaced by a distance on the order of 250 microns.

5. A method of forming an array of precisely and non-kinematically located lens shapes in a surface of a substrate, the substrate indexably positionable on a substrate holder, the substrate and the substrate holder rotatable about an axis of rotation, the axis of rotation normal to a plane parallel to the surface of the substrate, the method comprising:
providing a plurality of inter-fitting locating grooves on the substrate and the substrate holder, the inter-fitting locating grooves operationally configured to indexably position the substrate on the substrate holder along two orthogonal directions within the plane, the two orthogonal directions consisting of a first direction and a second direction, the plurality of inter-fitting locating grooves comprising first and second spaced portions of inter-fitting locating grooves oriented perpendicular to the first direction thereby allowing indexably positioning the substrate relative to the substrate holder along the first direction and, third and fourth spaced portions of inter-fitting locating grooves oriented perpendicular to the second direction thereby allowing indexably positioning the substrate relative to the substrate holder along the second direction;
positioning the substrate on the substrate holder whereby the inter-fitting locating grooves cause the axis of rotation to pass through a reference location on the surface of the substrate;
engaging a securing means to restrain the substrate on the substrate holder;
rotating the substrate and the substrate holder about the axis of rotation and machining a first lens shape into the surface of the substrate centered at the reference location;
disengaging the securing means to release the substrate from the substrate holder;
re-positioning the substrate on the substrate holder whereby the inter-fitting locating grooves cause the axis of rotation to pass through a next location on the surface of the substrate, the next location displaced a pre-determined distance along at least one of the first and second directions from the reference location;
engaging the securing means to restrain the substrate on the substrate holder; and,
rotating the substrate and the substrate holder about the axis of rotation and machining an additional lens shape into the surface of the substrate centered at the next location, whereby the next location is non-kinematically known relative to the reference location, by the action of the inter-fitting locating grooves.

6. The method of claim 5 further comprising repeating one or more times, the steps of:
disengaging the securing means to release the substrate from the substrate holder;
re-positioning the substrate on the substrate holder whereby the inter-fitting locating grooves cause the axis of rotation to pass through a next location on the surface of the substrate, the next location displaced a pre-determined distance along at least one of the first and second directions from the reference location;
engaging the securing means to restrain the substrate on the substrate holder; and,
rotating the substrate and the substrate holder about the axis of rotation and machining an additional lens shape into the surface of the substrate centered at the next location, whereby the next location is non-kinematically known relative to the reference location, by the action of the inter-fitting locating grooves.

7. The method of claim 5 wherein the step of providing a plurality of inter-fitting locating grooves on the substrate and the substrate holder comprises providing the plurality of inter-fitting grooves on one or more raised surface extensions, disposed on at least one of the substrate and the substrate holder.

8. The method of claim 5 wherein the securing means comprises a vacuum operated chuck.

9. The method of claim 5 wherein the step of re-positioning the substrate on the substrate holder further comprises the step of transferring the substrate from the substrate holder to a second substrate holder.

10. The method of claim 5 wherein the substrate comprises a disc of optically transparent material.

11. The method of claim 5 wherein the substrate comprises a lens mold master.

12. The method of claim 5 wherein the substrate comprises a top piece and an interposer, the interposer comprising the inter-fitting locating grooves operationally configured to indexably position the substrate on the substrate holder and, the top piece releasably attached to the interposer, the top piece comprising the surface into which the array of precisely located lens shapes are formed, and an opposed surface contacting the interposer.

* * * * *